Figure 1:
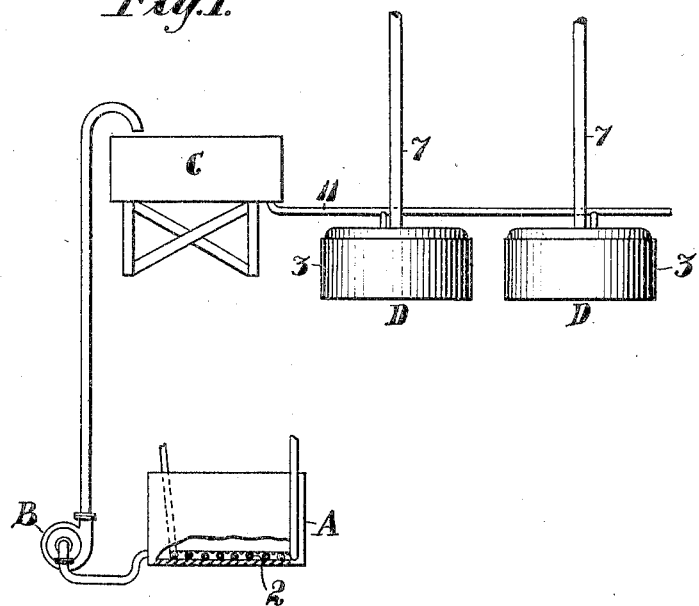

No. 789,478. PATENTED MAY 9, 1905.
H. P. BALDWIN.
METHOD OF CLEANING IMPURE AND VISCOUS SOLUTIONS.
APPLICATION FILED JUNE 20, 1904.

Witnesses:—
F. C. Fliedner
[signature]

Inventor,
Henry P. Baldwin
By Geo. H. Strong.
Atty.

No. 789,478. Patented May 9, 1905.

UNITED STATES PATENT OFFICE.

HENRY P. BALDWIN, OF PUUNENE, TERRITORY OF HAWAII.

METHOD OF CLEANING IMPURE AND VISCOUS SOLUTIONS.

SPECIFICATION forming part of Letters Patent No. 789,478, dated May 9, 1905.

Application filed June 20, 1904. Serial No. 213,298.

*To all whom it may concern:*

Be it known that I, HENRY P. BALDWIN, a citizen of the United States, residing at Puunene, in the Island of Maui and Territory of Hawaii, have invented new and useful Improvements in Methods of Cleaning Impure and Viscous Solutions, of which the following is a specification.

My invention relates to an improved method for extracting finely-divided substances in suspension from liquids of varying densities, and pertains particularly to the separation by centrifugal action of the solid saccharine particles from their liquids in the manufacture of sugar. There are certain liquids, especially solutions of sugar, natural juices of sugar-cane and sugar-beet, which contain in solution, substances that will crystallize, but are restrained from fully doing so by the presence of other substances in solution and in a very finely divided state held in suspension in the said liquids.

Referring to the manufacture of sugar, to which this invention especially applies, it is known that raw juices, concentrated syrups, and molasses contain foreign matters not sugar which increase the viscosity of the liquids and by their presence directly affect the yield of sugar from such solutions. It is also known that at certain densities of solution some of these impurities have a higher or lower specific gravity than the solution in which they are held in suspension and also that heretofore all attempts at filtration, as commonly understood, through cloth or paper or other filtering media have proved unsuccessful in removing these foreign matters, which consist chiefly of gums and resins from the plant furnishing the raw juice. It is also known that molasses at a high stage of concentration contains a considerable quantity of sugar crystallized and in suspension, but of such a small-sized grain that it escapes through the meshes of the centrifugal screens as ordinarily made and heretofore has been considered as loss.

Under ordinary sugar-making methods the heavy concentrated syrups after boiling are put through mixers and thoroughly stirred and are then delivered to the centrifugal machines, which usually have an outer imperforate casing and an inner revoluble perforated basket. The rapid spinning of the basket causes the fluent liquid to escape through the fine screens of the basket, while those solid particles which are not so fine as to pass through the screens are caught in the basket, the liquids and solids being separately recovered. This process is essentially a filtering process and, as stated above, is unsatisfactory because of the loss of so much of the valuable solids, which are in so comminuted a form as to be incapable of recovery by any such method.

The object of the present invention is to devise a practical, certain, and cheap method for handling heavy syrups and like viscous liquids whereby a complete separation of the liquid and contained solids or matter capable of crystallization may be effected.

My invention consists of the method which I will hereinafter describe and claim.

Figure 2:
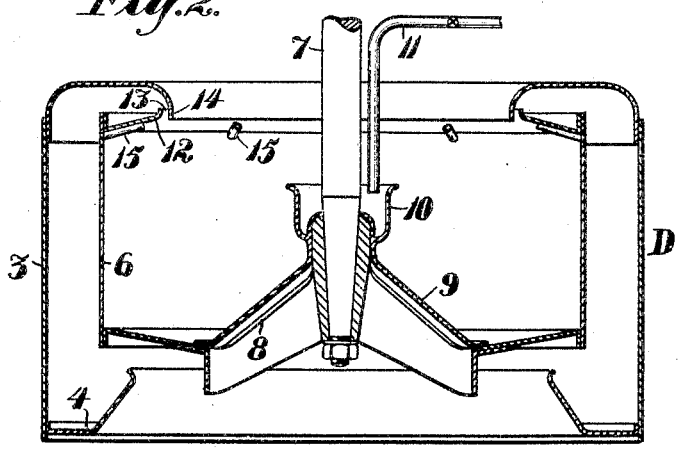

Figure 1 is an elevation in partial section of an apparatus for carrying out my method. Fig. 2 is a central vertical section of the separator.

A represents a tank of suitable shape and capacity into which the juices, syrups, or other liquids to be operated on are received. This tank is fitted with a steam-coil 2 to be used when necessary for diluting, heating, or otherwise treating the liquids.

B is a pump of suitable character used for delivering the treated liquid in tank A to the receiver C, whence it is piped to the centrifugals D. These latter each consist of an outer imperforate shell 3, having an annular trough-bottom 4, with a liquid discharge, and of an inner concentric imperforate basket 6, suitably mounted to be revolved in unison with the spindle 7. The latter is driven at a high rate of speed by any suitable means. The bottom of the basket inclines downwardly toward a central annular discharge-outlet 8, ordinarily closed by the conical valve 9. Valve 9 embraces and revolves with spindle 7 and carries an annular cup 10 on top, into which the liquid to be treated is received through pipe 11 from tank C and distributed evenly over the valve and radially of the basket.

*Dilution.*—In operation the liquid for treatment, in case it needs to be diluted or heated, is delivered first to tank A and therein brought by the addition of water and chemicals or heat, or both, together to the required condition and consistency. It has been found that the best results are obtained when the volume of molasses from which solids not sugar is to be separated is increased from twenty-five per cent. to forty per cent.—that is to say, for every one hundred gallons of molasses as received into the tank for dilution from twenty-five to forty gallons of water is added. The quantity varies with the original density of the molasses, which may contain anywhere from seventy-five per cent. to ninety per cent. of solids in solution, and it also varies with the character of the solids not sugar contained in the said molasses; but as the nature of these solids is to a great extent unknown no definite figures can be given for this variation.

*Chemicals.*—Sulfate of aluminium, oxalic acid, oxid of calcium, and other chemicals are used, the general function of which is to coagulate and by union with solids not sugar increase the specific gravity of the substance required to be removed.

*Heat.*—The temperatures required vary up to boiling-point of the solutions—say to 215° Fahrenheit—and are used in connection with the chemicals to promote reaction and coagulation of the substances to be removed. The period required for heating depends largely upon the quantity of solution to be treated and the heating-surface in the steam-coil, which is perforated, so as to be used for injecting water into the solution and thereafter by admission of steam to bring the said solution to the temperature required. The liquid is then pumped to the receiver C and thence delivered as needed to the machines. A basket being set in motion and liquid admitted through pipe 11, the centrifugal force developed in the solids in suspension compels these solids, which have a relatively greater specific gravity than the medium in which they are suspended, to fly to the circumference, where they lodge, no means of escape being provided, and where they arrange themselves cumulatively in an annular body with the liquor in the center of the machine. Inflow through pipe 11 and radial distribution by cup 10 continues until the separated liquor reaches the edge of the inturned top 12 of the basket, whereupon it escapes through the slit 13 between this edge and the inturned lip 14 of the outer shell 3 into trough 4, whence it is discharged through opening 5. The attendant regulates the feed of liquid to the machine by an observance of the overflow through the small radially-disposed pipes 15 on the under side of the top 12 of the basket. When the basket is filled with solids up to the outlet 13 and to a depth sufficient to cut off further flow through pipes 15, the machine is stopped, the valve 9 opened, and the solids discharged through the bottom of the machine. After passing through a machine the separated liquid is pumped off to proper tanks or vats (not here shown) and taken into manufacture, while the worthless residues are removed in any suitable manner.

Having thus described my invention, what I claim, and desire to secure by Letters Patent, is—

1. The method herein described of cleaning an impure and viscous solution, containing objectionable substances of about the same specific gravity as itself, in suspension, in a finely-divided state, which method consists in diluting the solution with a fluid until the specific gravity of the substances in suspension, is slightly greater than the specific gravity of the dilution, and then centrifugaling the dilution whereby the centrifugal force will act upon said objectionable substances against the viscocity of the solution under operation, and thus drive them out.

2. The method herein described of cleaning an impure and viscous molasses containing in suspension in a finely-divided state, non-saccharine solids of about the same specific gravity as itself, which method consists in diluting the solution with water to such a point that the specific gravity of the said non-saccharine solids in suspension, is slightly greater than the specific gravity of the dilution, and then subjecting the solution to centrifugal action to cause the said non-saccharine solids to act against the viscosity of the solution under operation, and thus expel said solids.

In testimony whereof I have hereunto set my hand in presence of two subscribing witnesses.

H. P. BALDWIN.

Witnesses:
   G. L. KEENEY,
   J. N. S. WILLIAMS.